June 22, 1948.  M. M. SEELOFF  2,443,966
WELDING ELECTRODE HOLDER
Filed April 7, 1945
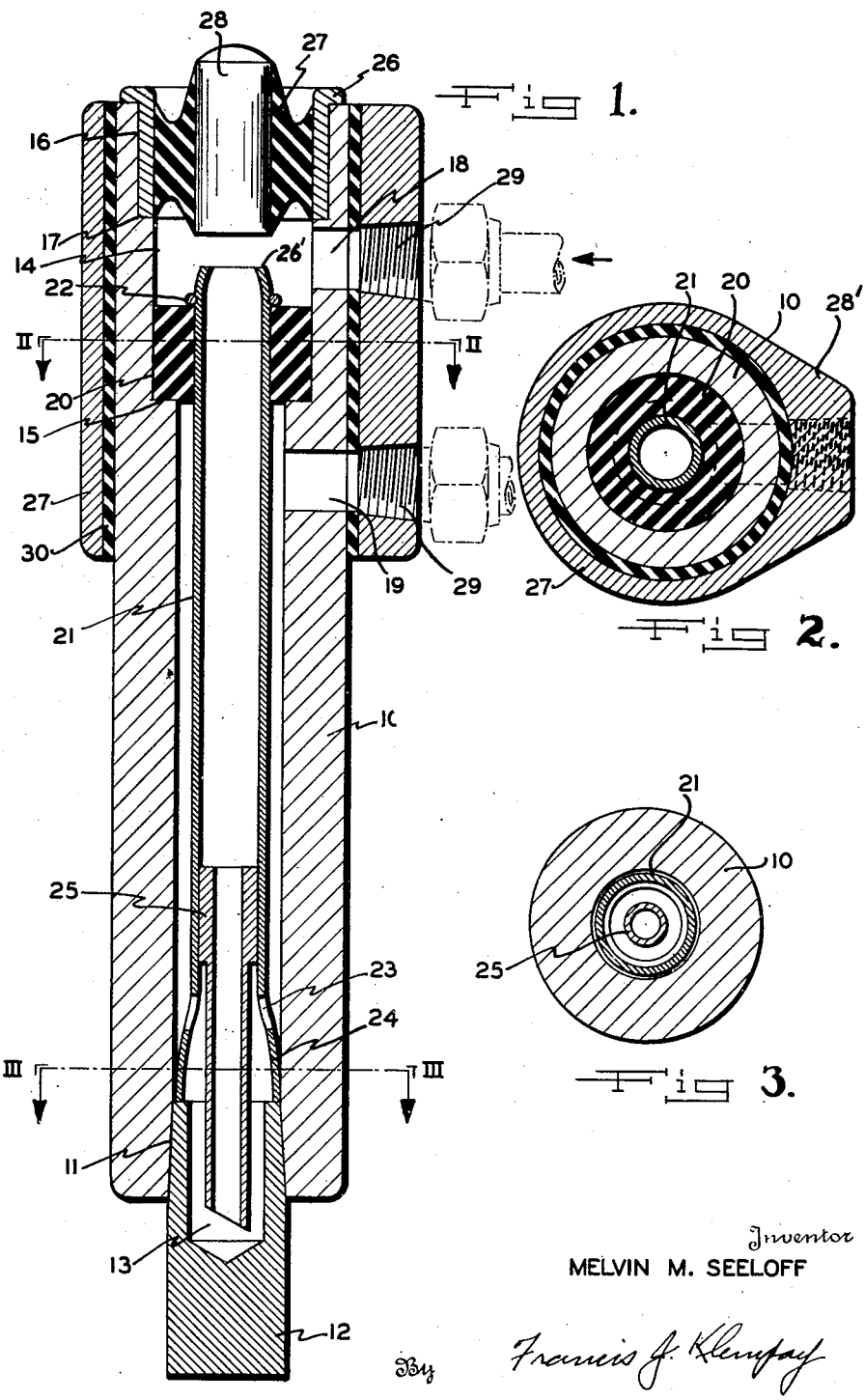
Inventor
MELVIN M. SEELOFF
By Francis J. Klempay
Attorney Patented June 22, 1948

2,443,966

UNITED STATES PATENT OFFICE 2,443,966

WELDING ELECTRODE HOLDER

Melvin M. Seeloff, Warren, Ohio, assignor to The Taylor-Winfield Corporation, Warren, Ohio, a corporation of Ohio Application April 7, 1945, Serial No. 587,080

8 Claims. (Cl. 219—4)

This invention relates to electrode holders for electric resistance welding apparatus and more particularly to current conductive supporting devices for removably retaining welding electrode tips and for conducting cooling fluid thereto. In such devices it is normally desirable to interconnect the welding tip and holder therefor in such manner that the tip may readily be removed from and positioned in the holder and, further, that means be provided to readily eject the tip from the holder to facilitate, during production use of the welding machine, changing of the tips as will be understood. It is one of the primary objects of this invention to provide a substantially improved and more rugged electrode holder for retaining and ejecting the welding electrode tip.

A further object of the invention is the provision of an improved holder for welding electrode tips in which materially improved arrangements for circulating a coolant through the recesses or hollowed-out portions of the tips is utilized.

A more specific object of the invention is the provision of a more simplified and durable combined coolant fluid conducting and ejector arrangement for use in an electrode tip holder of the type in which a tapered socket is employed to receive and retain the separable electrode tips.

Other objects of the invention include the reduction in the number of parts required for devices of the character involved and the simplification of the construction and assembly of these parts whereby the holder may be produced at substantially less cost than heretofore involved in the construction of holders for comparable purposes, and improvements in the coolant fluid retaining qualities of such holders.

The above and other objects and advantages of the invention will become apparent upon consideration of the following detailed specification and the accompanying drawing wherein there is specifically disclosed a preferred embodiment of the invention.

In the drawing:

Figure 1 is a vertical section through an assembled welding electrode tip holder constructed according to the principles of the invention; and Figures 2 and 3 are transverse sections taken along the lines II—II and III—III, respectively, of Figure 1.

Referring to the drawing, reference numeral 10 designates a tubular body member preferably constructed of a copper alloy having suitable current conductive and mechanical strength characteristics. The lower end of the opening through the body member 10 is tapered at 11 to provide a socket for receiving a correspondingly tapered section of a separable welding electrode tip 12. In accordance with the usual practice, tip 12 is provided with a recess or bore 13 extending inwardly from the inner end thereof through which cooling fluid may circulate to prevent the tip from becoming overheated. The opposite end of the opening through the body member 10 is enlarged at 14 resulting in a shoulder 15 and is further enlarged at 16 resulting in a shoulder 17. An inlet port 18 is provided in the side wall of the body 10 towards the upper end of the bore enlargement 14 and an outlet port 19 is also provided in the side wall of body 10 but positioned below the shoulder 15. It should be observed that the body member 10 is of such simple design as to readily lend itself to economical production on automatic metal working equipment.

Positioned within the bore enlargement 14 and seated against the shoulder 15 is a yieldable annulus 20, preferably formed of rubber and extending through this annulus 20 is the upper end portion of tube 21. The parts are so dimensioned that the annulus 20 fits tightly over the tube and in the bore 14 so that in addition to functioning as a centering device for the tube 21 the annulus 20 also seals the exterior surface of the lower portion of the tube from the space in the bore 14 above the member 20. The yieldable nature of the member 20 allows the tube 21 to move axially with respect to the member 10 and tends to restore the tube 21 to its initial position following displacement therefrom. If desired, a snap ring 22 may be employed to prevent withdrawal of the upper end portion of the tube 21 from the annulus 20, ring 22 fitting within an annular groove formed in the upper end portion of the tube 21. A similar ring may be used below the annulus 20 to prevent downward movement of the tube 21 when the holder is used in an inverted position although it should be understood that if the material of the annulus 20 is suitably bonded to the tube 21 or if the frictional interengagement is sufficient to prevent longitudinal movement of the tube in the opening through member 20 the need for these ancillary retaining devices is obviated. The lower end portion of the tube 21 is provided with a plurality of circumferentially spaced apertures 23 and is expanded as shown at 24, the interrelation being preferably such that apertures 23 fall in the conical section of the tube. In practice, the lower end of the tube 21 is expanded to such dimension that it fits loosely in the bore of the member 10 whereby the lower end of the tube is retained generally concentrically in the body 10 but is free to move axially therein. The lower end of the tube 21 is adapted to abut the upper or inner end of the electrode tip 12.

Telescoping within the lower portion of the tube 21 is a tube 25 having its lower end received in the bore 13 of the tip 12. The lower end surface of tube 25 is obliquely disposed so that even if the outermost tip of the tube 25 should contact the bottom of bore 13 cooling fluid could still continue to circulate through the tube and bore. As shown, the external diameter of the tube 25 is preferably smaller below or outwardly of its inner end portion which has sliding engagement with the inner surface of the tube 21 so that a passage of adequate size is provided in the annular space intermediate the tube 25 and the lower end portion of the tube 21 as well as through the apertures 23 as will be understood.

Press-fitted in the bore 16 of the body member 10 and abutting the shoulder 17 is metal ferrule 26 bonded to the outer periphery of a second resilient annulus 27 also preferably formed of rubber. Extending axially through the center of the annulus 27 and also permanetly bonded thereto is a metal rod 28 which projects outwardly of the outer end of the ferrule 26 as shown in the drawing. The bottom end of the rod 28 is normally spaced outwardly of the upper end of the tube 21 to allow cooling fluid to enter the tube 21 from the port 18. However, upon striking the rod or pin 28 with a hammer or other instrument the annulus 27 will flex axially to allow the lower end of rod 28 to rap the upper end of tube 21. This impact jars tube 21 downwardly and the blow is thus transmitted to the tip 12 to knock the tip out of the holder. The upper end of the tube 21 is preferably swaged inwardly at 26' to provide a more concentrated and more centrally disposed mass of metal to receive the blow of the pin 28.

On the upper end portion of the body member 10 I mount a collar 27 having a radially extending but axially elongated boss 28' bearing tapped apertures 29 which are positioned in registry with the ports 18 and 19 and which are adapted to be engaged by threaded fittings of a conduit system for circulating cooling fluid into and out of the holder. The inner diameter of the collar 27 is somewhat larger than the outer diameter of the body member 10 to provide an annular space for an insulating tubular gasket 30. This gasket may consist simply of a length of rubber tubing and in assembling the parts this tubing is first stretched out thinly over the member 10 after which the collar 27 is applied in proper position. Now by simply letting go of the ends of the tube the material of the tube gathers together in an axial direction thereby tightening the collar 27 on the body member 10 as will be understood. The side wall of the gasket tubing is apertured in registry with the ports 18 and 19 after assembly of the parts. It should be observed that the tubular gasket 30 performs the additional functions of sealing off the passageways through apertures 29 and the ports 18 and 19 and of resiliently mounting the collar 27 with respect to the body member 10 so that impacts applied to the latter will not be transmitted with full force to the collar and conduit connections associated therewith.

The above specifically described embodiment of the invention should be considered as illustrative only as obviously many changes may be made therein without departing from the spirit or scope of the invention. For example, while I have shown the tube 21 as being round, the same may readily be square in cross-section or some other shape in which case the vertical passages for the upward conduction of the cooling fluid would be comprised of the chordal interstices between the flatter section of the tube and the wall of the opening through the body member 10. Likewise, the apertures in such square tube corresponding to the apertures 23 would be located on the flatter portions of the tube.

In operation, the body member 10 is clamped in or to a current conductive horn of the welding machine and the apertures 29 are connected in the cooling fluid circulating system whereby such fluid will enter the holder through port 18 and pass out of the holder through port 19. A tip is inserted in the holder as shown and in this condition of the parts the assembly is operative for resistance welding purposes. The cooling water or other fluid employed circulates downwardly through tube 21, tube 25, recess 13 of the tip 12, thence outwardly through apertures 23 and upwardly through the space between the wall of the bore through body 10 and the outer surface of tube 21 to the outlet port 19. When it is desired to change the tip 12 the same may be readily removed from the holder by striking the pin 28 which transmits the blow to the tube 21, the latter in turn driving out the tip 12. The resilient nature of the annulus 20 retracts the tube 21 or allows it to be retracted so that another tip may readily be inserted in frictionally held position in the tapered bore 11.

It should now be apparent that I have provided an improved resistance welding electrode holder which accomplishes the objects initially set out. The assembly employs but a minimum number of parts each of which is rugged and durable in nature while yet simple in design and thus capable of rapid and economical manufacture. Further, the holder may be assembled by substantially any workman and with but a minimum of special tools and fixtures. When assembled, the holder is entirely fluid-tight and its qualities of ruggedness and durability makes it well suited for the severe conditions of service normally imposed on such devices.

Reference should be had to the appended claims in determining the scope of the invention.

What I claim is:

1. A welding electrode tip holder comprising in combination a current conductive tubular member having socket means at its lower end to frictionally retain a welding electrode tip, a tube positioned in said member and adapted to have abutting engagement with the inner end of said electrode tip, means yieldably supporting the upper end portion of said tube and providing a fluid barrier in the space intermediate said tube and the inner side wall surface of said member, ports in the side wall of said member on opposite sides of said barrier means, a rod generally aligned with but normally axially spaced from the upper end of said tube, fluid impervious yieldable means mounting said rod in the upper end portion of said member, apertures in the lower end portion of the side wall of said tube, and an inner tube held in the lower portion of said first mentioned tube at a point above said apertures but extending past said apertures and outwardly of the lower end of said first mentioned tube, the outer wall of said inner tube being spaced inwardly of the side wall of said first mentioned tube in the vicinity of said apertures and therebelow.

2. A welding electrode tip holder comprising in combination a current conductive tubular member having socket means at one end to frictionally retain a welding electrode tip, a tube positioned in said member in radially inward spaced relation to the side wall of the opening in said member and adapted to have abutting engagement with the inner end of said electrode tip, means yieldably supporting said tube in said member and providing a fluid barrier in the space intermediate said tube and the side wall of the opening in said member, ports in the side wall of said member on opposite sides of said barrier means, a rod generally aligned with but normally axially spaced from the end of said tube opposite the end thereof engaging said tip, fluid impervious yieldable means mounting said rod in said member for axial movement therein, said rod extending outwardly of said member, and said tube having apertures in its side wall in the end portion thereof adjacent said tip.

3. A device according to claim 2 further characterized in that the end of said tube engaging said tip is enlarged in diameter to provide a bell-shaped lower portion in said tube, said apertures being positioned in said bell-shaped portion of said tube.

4. A device according to claim 2 further characterized in that the end of said tube adjacent said tip is enlarged in diameter to provide a bell-shaped end portion for said tube, said apertures being positioned in said bell-shaped portion of the tube, and a tube having a portion slideably engaging the inner surface of said first mentioned tube at a point inwardly of said apertures and extending outwardly of the end of said first mentioned tube.

5. A welding electrode tip holder comprising in combination a current conductive tubular member having socket means at one end to frictionally retain a welding electrode tip, a tube positioned in said member and adapted to having abutting engagement with the inner end of said electrode tip, said tube having a longitudinally extending outer surface positioned radially inward from the side wall of said member to provide an axially extending fluid conducting passage, means yieldably supporting said tube in said member and providing a fluid barrier in said passage, ports in the side wall of said member on opposite sides of said barrier means, apertures in the end portion of said tube adjacent said tip, an inner tube having an enlarged portion slideably engaging the inner surface of said first mentioned tube inwardly of said apertures and adapted to extend outwardly of the adjacent end of said first mentioned tube, a rod at least partially received in said member adjacent the end thereof opposite said tip, and fluid impervious yieldable means mounting said rod in said member.

6. In a welding electrode tip holder having a current conductive tubular member with socket means at one end to frictionally retain a welding electrode tip, a fluid conducting and tip ejecting tube positioned in said member and adapted to have abutting engagement with the inner end of said tip, at least a portion of the side wall of said tube being spaced radially inward of the side wall of said member to provide a longitudinally extending fluid passage, means at the lower end of said tube to circulate cooling fluid through said tube and passage and into heat exchanging relation with the metal of said tip, axially yieldable means mounting said tube in said member, and means connecting said tube and said passage with fluid conducting conduits.

7. A welding electrode tip holder comprising in combination a current conductive tubular member having socket means at one end to frictionally retain a welding electrode tip, a tube positioned in said member and adapted to have abutting engagement with the inner end of said electrode tip, said tube having at least a portion of its outer surface spaced radially inward from the wall of said member to provide a longitudinally extending passage, an aperture in the end portion of said tube adjacent said tip, fluid impervious yieldable means mounting said tube in said member and forming a fluid barrier in said passage, and ports in the side wall of said member on opposite sides of said barrier.

8. A device according to claim 7 further including a sleeve encompassing said member in the region of said ports, said sleeve having an integral radially directed but axially extending boss having spaced tapped openings in register with said ports, and an insulating gasket between the outer surface of said member and the inner surface of said sleeve.

MELVIN M. SEELOFF.

REFERENCES CITED

The following references are of record in the file of this patent:

UNITED STATES PATENTS

| Number | Name | Date |
| --- | --- | --- |
| 2,093,092 | McElhany | Sept. 14, 1937 |
| 2,271,119 | Cox et al. | Jan. 27, 1942 |